(12) United States Patent
Lloyd

(10) Patent No.: US 12,467,829 B2
(45) Date of Patent: Nov. 11, 2025

(54) MEASUREMENT SYSTEM AND TESTING METHOD OF TESTING A DEVICE UNDER TEST

(71) Applicant: Rohde & Schwarz GmbH & Co. KG, Munich (DE)

(72) Inventor: Paul Gareth Lloyd, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 412 days.

(21) Appl. No.: 18/050,383

(22) Filed: Oct. 27, 2022

(65) Prior Publication Data
US 2024/0142345 A1    May 2, 2024

(51) Int. Cl.
G06F 11/30    (2006.01)
G01M 99/00    (2011.01)
G06F 11/273    (2006.01)

(52) U.S. Cl.
CPC ......... *G01M 99/005* (2013.01); *G06F 11/273* (2013.01)

(58) Field of Classification Search
CPC ........................... G06F 11/273; G01M 99/005
See application file for complete search history.

(56) References Cited

U.S. PATENT DOCUMENTS

| | | | |
|---|---|---|---|
| 6,509,743 B1 | 1/2003 | Ferrero | |
| 6,639,393 B2 | 10/2003 | Tasker et al. | |
| 9,973,219 B2 | 5/2018 | Lagler et al. | |
| 10,652,051 B2 | 5/2020 | Simpson et al. | |
| 11,156,690 B2 | 10/2021 | Simpson | |
| 11,199,568 B2 | 12/2021 | Esposito et al. | |
| 2006/0182231 A1* | 8/2006 | Tan | H04B 17/0085 379/30 |
| 2017/0254871 A1* | 9/2017 | Sestok, IV | G01R 27/14 |

FOREIGN PATENT DOCUMENTS

| | | |
|---|---|---|
| EP | 3004911 B1 | 10/2018 |
| WO | 2005/010538 A1 | 2/2005 |
| WO | 2022/060655 A1 | 3/2022 |

OTHER PUBLICATIONS

Marchetti, M. et al., "Active Harmonic Load-Pull With Realistic Wideband Communications Signals," Maury Microwave Corp., Jun. 2010, California, USA, pp. 1-3 (Year: 2010).*

(Continued)

*Primary Examiner* — Phuong Huynh
(74) *Attorney, Agent, or Firm* — CHRISTENSEN O'CONNOR JOHNSON KINDNESS PLLC

(57) ABSTRACT

A measurement system includes a common port, the common port being connectable to a signal output of the device under test. The measurement system further includes a signal line being connected to the common port, wherein the signal line includes a first directional coupler portion and a second directional coupler portion. The measurement system further includes a signal processing circuit, wherein the signal processing circuit includes an IQ analysis circuit and an IQ synthesizer circuit. The IQ analysis circuit is connected with the common port via the first directional coupler portion so as to receive a forward-travelling signal from the common port. Further, a testing method of testing a device under test is described.

20 Claims, 7 Drawing Sheets

(56) References Cited

OTHER PUBLICATIONS

Baker, D.W. et al., "On-Wafer Load Pull Characterization of W-Band InP HEMT Unit Cells for CPW MMIC Medium Power Amplifiers", 1999 IEEE MTT-S Digest.
Hosein, B. and T. Beauchamp, "Impedance Synthesis Algorithms for Hybrid Harmonic Load Pull," Focus Microwaves, Quebec, Canada.
"Hybrid Tuners", Focus Microwaves, Product Note 92, Jul. 2017, Quebec, Canada.
"Instruments Simplify Load Pull Testing of High Power Transistors", Applied Microwaves and Wireless, pp. 84-91.
Dr. Christos Tsironis, "Load Pull Characterization", Focus Microwaves Group, White Paper #64, Mar. 2019.
"Manual Tuners Help Make Precise Load Pull and Noise Measurements", Applied Microwave and Wireless, Jan. 1999, pp. 96-97.
Marchetti, M. et al., "Active Harmonic Load-Pull With Realistic Wideband Communications Signals," Maury Microwave Corp., Jun. 2010, California, USA, pp. 1-13.
"Prematching Tuners for Very High SWR and Power Load Pull Measurements," Microwave Journal, Jan. 2000, vol. 43:1, 3 pages.
"An Intelligent Microwave Tuner," Microwave Journal, May 2003, Montreal, Quebec, Canada, 2 pages.
"Microwave File and Design Window Compression Load Pull Measurements," Microwave Journal, Oct. 1997, 7 pages.
"Load-Pull Tuners Are Frequency Selective," Microwaves & RF, Jan. 2004, vol. 43:1, 4 pages.
"MPT, a Universal Multi-Purpose Tuner", Focus Microwaves, Product Note 79, Oct. 2004, Quebec, Canada, 9 pages.
"Multipurpose Tuners Control Impedances from 20 to 110 GHz", Microwaves & RF, Jack Browne, Focus Microwaves Inc., Quebec, Canada, 3 pages.

\* cited by examiner

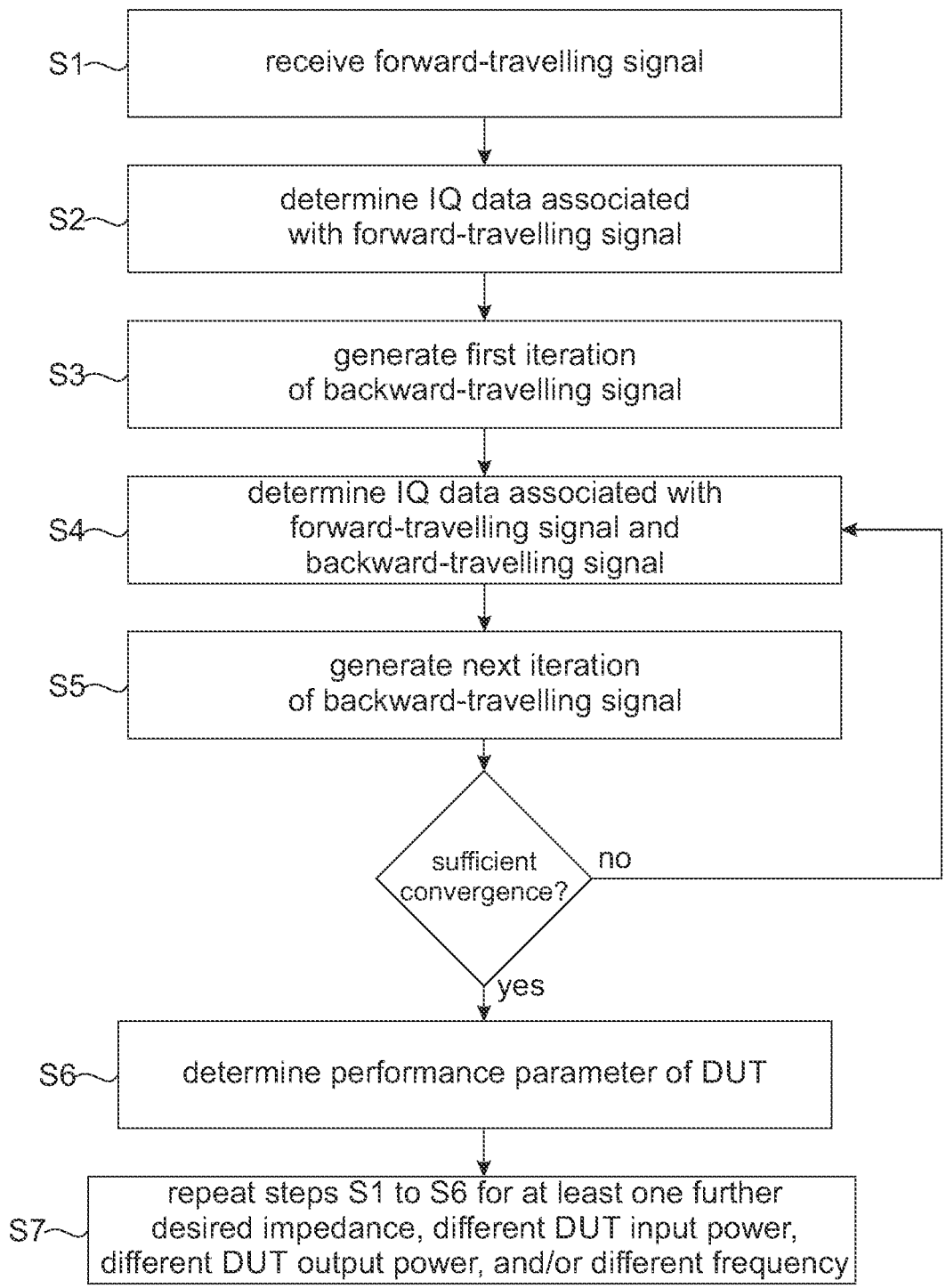

MEASUREMENT SYSTEM AND TESTING METHOD OF TESTING A DEVICE UNDER TEST

FIELD OF THE DISCLOSURE

Embodiments of the present disclosure generally relate to a measurement system for testing a device under test. Embodiments of the present disclosure further relate to a testing method of testing a device under test.

BACKGROUND

With increasing demands on the performance of electronic devices and of electronic components, post-production testing of the performance of these devices and components is becoming ever more important.

Due to impedance mismatches within the measurement system, reflections of signals generated by the device under test may occur that impair the measurements of the performance of the device under test.

A known solutions to mitigate the influence of these reflections involves linear correction techniques, wherein the influence of the reflections is accounted for by linear corrections in the measured data.

Another known solution is so-called impedance matching, wherein the load presented to the device under test is matched, such that no reflections occur in the measurement system.

However, under certain circumstances it may be desirable to test the device under test under "non-matched" conditions, i.e. with reflections occurring in the measurement system.

Accordingly, there is a need for a measurement system and for a testing method that allow for testing a device under test under a larger variety of load conditions.

SUMMARY

Embodiments of the present disclosure provide a measurement system for testing a device under test. In an embodiment, the measurement system comprises a common port connectable to a signal output of the device under test. The measurement system also comprises a signal line being connected to the common port, wherein the signal line comprises a first directional coupler portion and a second directional coupler portion. The measurement system further comprises a signal processing circuit composed of, for example, an IQ analysis circuit and an IQ synthesizer circuit. The IQ analysis circuit is connected with the common port via the first directional coupler portion so as to receive a forward-travelling signal from the common port. The IQ analysis circuit is configured to determine IQ data associated with the forward-travelling signal. The IQ synthesizer circuit is connected to the signal line, wherein the IQ synthesizer circuit is configured to generate a backward-travelling signal that is forwarded to the common port. The IQ analysis circuit is further connected with the signal line via the second directional coupler portion so as to receive the backward-travelling signal. The IQ analysis circuit is configured to determine IQ data associated with the backward-travelling signal.

According to the present disclosure, an output signal generated by the device under test is forwarded to and analyzed by the IQ analysis circuit. The IQ analysis circuit determines in-phase and quadrature data (IQ data) of the signal received from the device under test. Based on the analysis of the output signal of the device under test, the backward-travelling signal is synthesized and forwarded to the common port, such that the backward-travelling signal is forwarded to the device under test.

In other words, a reflected signal is synthesized in response to the output signal of the device under test based on an analysis of the output signal, such that a non-matched impedance is presented, i.e. applied to the device under test.

Conversely, the impedance presented to the device under test can be altered by varying the backward-travelling signal generated by the synthesizer circuit. Thus, the measurement system according to the present disclosure allows for testing the device under test under a large variety of different load conditions.

Further, the backward-travelling signal is also analyzed by the IQ analysis circuit. Thus, the actual backward-travelling signal forwarded to the device under test is known, such that the precise measurement conditions, e.g. the precise load presented to the device under test, is known for performing tests on the device under test.

In some embodiments, the measurement system may be used for single-port measurements or for multi-port measurements of the device under test.

Therein, the forward-travelling signal may be known or unknown to the measurement system, i.e. the measurement system can be used for testing devices under test generating known or unknown output signals.

The first directional coupler portion and the second directional coupler portion may be established as separate directional couplers. In other words, the first directional coupler portion and the second directional coupler portion may be established as a three-port directional coupler, respectively.

Alternatively, the first directional coupler portion and the second directional coupler portion may be integrated into a single directional coupler, for example into a four-port directional coupler. In this case, the term "directional coupler portion" may relate to different signal paths within the directional coupler, for example in the four-port directional coupler.

According to an aspect of the present disclosure, the backward-travelling signal is, for example, an IQ data stream. Likewise, the output signal of the device under test may be an IQ data stream, such that the forward-travelling signal is an IQ data stream. Thus, the format of the backward-travelling signal matches the format of the forward-travelling signal.

According to another aspect of the present disclosure, the signal processing circuit further comprises, for example, a control circuit. In some embodiments, the control circuit is configured to control the IQ synthesizer circuit such that a predefined reflection coefficient is obtained, wherein the predefined reflection coefficient corresponds to a ratio of the backward-travelling signal and the forward-travelling signal. More precisely, the predefined reflection coefficient may be a predetermined ratio of the complex amplitudes of the backward-travelling signal and of the forward-travelling signal. Thus, the predefined reflection coefficient is a complex number. In other words, the IQ synthesizer is controlled to generate a suitable backward-travelling signal, such that the predefined reflection coefficient is obtained.

As the predefined reflection coefficient is associated with a certain impedance presented to the device under test, the impedance presented to the device under test can be altered by setting a different value for the predefined reflection coefficient.

In an embodiment of the present disclosure, the control circuit is configured to control the IQ synthesizer circuit to iteratively adapt the backward-travelling signal, such that the predefined reflection coefficient is obtained. This way, the impedance presented to the device under test can be set in a particularly precise manner, as transient oscillations in the measurement system are accounted for.

In some embodiments, the backward-travelling signal may be iteratively adapted based on the IQ data associated with the forward-travelling signal and based on the IQ data associated with the backward-travelling signal. Thus, a closed-loop control of the generated backward-travelling signal is provided, as the previously generated backward-travelling signal is taken into account for generating the next iteration of the backward-travelling signal.

In a further embodiment of the present disclosure, the forward-travelling signal is periodic for at least a predetermined number of iterations. In other words, the forward-travelling signal may be periodic at least for the time that it takes for the processing circuit to generate the predetermined number of iterations of the backward-travelling signal. Thus, it is ensured that the actual reflection coefficient and thus the actual impedance presented to the device under test has enough time to converge.

For example, the device under test may be controlled to generate the same forward-travelling signal for at least the predetermined number of iterations. Therein, the device under test may be controlled by an operator or by the measurement system, for example by the control circuit.

A further aspect of the present disclosure provides that the predefined reflection coefficient is determined, for example, based on a desired impedance that is to be applied to the device under test. As already mentioned above, the impedance presented or rather applied to the device under test is associated with a corresponding reflection coefficient. Conversely, the predefined reflection coefficient can be determined based on the desired impedance, and the backward-travelling signal to be generated can be determined based on the predefined reflection coefficient, such that the backward-travelling signal to be generated can be determined based on the desired impedance.

In some embodiments, the predefined reflection coefficient is determined based on the desired impedance and based on a characteristic impedance of the measurement system.

Therein, the characteristic impedance may correspond to the impedance of cables and/or other components of the measurement system. Typically, the characteristic impedance is in the magnitude of 50 Ohm.

According to an aspect of the present disclosure, the predefined reflection coefficient is determined, for example, according to $K=(Z_T-Z_0^*)/(Z_T+Z_0)$, wherein K is the predefined reflection coefficient, $Z_T$ is the desired impedance, $Z_0$ is the characteristic impedance, and $Z_0^*$ is the complex conjugate of the characteristic impedance. Thus, the predefined reflection coefficient can be determined unambiguously based on the desired impedance and based on the characteristic impedance.

In a further embodiment of the present disclosure, the IQ analysis circuit is configured to analyze an output signal of the device under test after the predefined reflection coefficient is obtained, thereby obtaining at least one performance parameter of the device under test. Thus, the performance of the device under test can be analyzed with a specific impedance, namely the desired impedance, being applied to the device under test.

For example, the at least one performance parameter comprises an error vector magnitude (EVM) and/or an adjacent channel leakage ratio (ACLR). Thus, the EVM and/or the ACLR of the device under test can be determined with the desired impedance applied to the device under test.

However, it is to be understood that any other suitable performance parameter of the device under test may be determined.

In an embodiment of the present disclosure, the at least one performance parameter is determined for at least one further predefined reflection coefficient, for a different DUT input power, a different DUT output power, and/or a different frequency of the forward-travelling signal. In other words, after the at least one performance parameter is determined, a new predefined reflection coefficient is set as described above, and the at least one performance parameter is determined. This may be repeated an arbitrary number of times for an arbitrary number of predefined reflection coefficients, different DUT input powers (i.e. different power levels of an input signal applied to the device under test), different DUT output powers (i.e. different power levels of an output signal of the device under test and thus different power levels of the forward-travelling signal), and/or different frequencies of the forward-travelling signal (i.e. different frequencies of the output signal generated by the device under test). Thus, the at least one performance parameter may be determined for a plurality of different impedances applied to the device under test, for a plurality of different input power levels of the device under test, for a plurality of different output power levels of the device under test, and/or for a plurality of different frequencies of the output signal of the device under test.

In some embodiments, IQ data associated with the forward-travelling signal and the IQ data associated with the backward-travelling signal are determined in time domain. In other words, no fast Fourier transform (FFT) is applied to the forward-travelling signal in order to determine the IQ data associated with the forward-travelling signal. Likewise, no fast Fourier transform (FFT) is applied to the backward-travelling signal in order to determine the IQ data associated with the backward-travelling signal.

It has turned out that the IQ data associated with the forward-travelling signal and the IQ data associated with the backward-travelling signal can be determined in a particularly precise and fast manner if the corresponding calculations are done in time domain. Further, this allows for the IQ analysis circuit being integrated in an FPGA, which further enhances the processing speed.

According to an aspect of the present disclosure, the backward-travelling signal is generated, for example, in time domain. Thus, no FFT is applied to the IQ data associated with the backward-travelling signal (and the IQ data associated with the backward-travelling signal) in order to determine (the next iteration of) the backward-travelling signal. It has turned out that the backward-travelling signal can be determined in a precise and fast manner if the corresponding calculations are done in time domain. Further, this allows for the IQ synthesizer circuit being integrated in an FPGA, which further enhances the processing speed.

In some embodiments, all operations performed by the IQ analysis circuit and by the IQ synthesizer circuit may be performed in time domain.

According to another aspect of the present disclosure, the forward-travelling signal is, for example, a single carrier orthogonal frequency division multiplexing (OFDM) signal. Thus, the measurement system may be used in order to test devices under test that are configured to generate OFDM signals, for example single carrier OFDM signals. For example, the measurement system may be configured to test mobile phones.

However, it is to be understood that the measurement system may be configured to test any device under test being configured to process and/or generate an IQ data signal.

In an embodiment of the present disclosure, the IQ analysis circuit is configured to determine the IQ data associated with the forward-travelling signal and/or the IQ data associated with the backward-travelling signal in absence of a reference signal. In other words, no externally provided reference signal is necessary in order to perform tests on the device under test with the measurement system according to the present disclosure.

In some embodiments, the IQ analysis circuit is configured to mix the forward-travelling signal with a local oscillator signal in the analog domain or in the digital domain in order to determine the IQ data associated with the forward-travelling signal.

Alternatively or additionally, the IQ analysis circuit is configured to mix the backward-travelling signal with a local oscillator signal in the analog domain or in the digital domain in order to determine the IQ data associated with the backward-travelling signal.

If the respective signal is mixed in the analog domain, the IQ analysis circuit may comprise an analog mixer that is configured to generate an analog I-signal corresponding to the respective signal as well as an analog Q-signal corresponding to the respective signal. The IQ analysis circuit may further comprise two analog-to-digital converters that are configured to digitize the generated I-signal and the generated Q-signal.

If the respective signal is mixed in the digital domain, the IQ analysis circuit may comprise an analog-to-digital converter that is configured to digitize the respective signal. The IQ analysis circuit may further comprise a digital mixer that is configured to generate a digital I-signal corresponding to the respective digitized signal as well as a digital Q-signal corresponding to the respective digitized signal.

The IQ synthesizer circuit may comprise a digital-to-analog converter for generating the backward-travelling signal. In other words, IQ data associated with the backward-travelling signal is generated in the digital domain by means of the IQ synthesizer circuit, wherein the IQ data is converted into an analog signal, namely the backward-travelling signal, by means of the digital-to-analog converter.

Embodiments of the present disclosure further provide a testing method of testing a device under test. In an embodiment, the testing method includes the following steps: receiving, by a common port, an output signal of the device under test; forwarding, by a first directional coupler portion, a forward-travelling signal corresponding to the output signal to an IQ analysis circuit of a signal processing circuit; determining, by the IQ analysis circuit, IQ data associated with the forward-travelling signal; generating, by an IQ synthesizer circuit, a backward-travelling signal; forwarding, by a second directional coupler portion, the backward-travelling signal to the IQ analysis circuit; and determining, by the IQ analysis circuit, IQ data associated with the backward-travelling signal.

In some embodiments, embodiments of the measurement system described above are configured to perform any of the testing methods of testing a device under test.

Regarding the further advantages and properties of the testing method, reference is made to the explanations given above with respect to the measurement system, which also hold for the testing method and vice versa.

According to an aspect of the present disclosure, the backward-travelling signal is, for example, iteratively adapted such that a predefined reflection coefficient is obtained, wherein the predefined reflection coefficient corresponds to a ratio of the backward-travelling signal and the forward-travelling signal. This way, the impedance presented to the device under test can be set in a particularly precise manner, as transient oscillations in the measurement system are accounted for.

In some embodiments, the backward-travelling signal may be iteratively adapted based on the IQ data associated with the forward-travelling signal and based on the IQ data associated with the backward-travelling signal. Thus, a closed-loop control of the generated backward-travelling signal is provided, as the previously generated backward-travelling signal is taken into account for generating the next iteration of the backward-travelling signal.

In an embodiment of the present disclosure, all steps are performed in time domain. In other words, all steps of the method are performed without applying an FFT to any one of the forward-travelling signal, the backward-travelling signal, the IQ data associated with the forward-travelling signal, and the IQ data associated with the backward-travelling signal.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 4 depicts a flow chart of a testing method according to an embodiment of the present disclosure;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Similarly, any steps described herein may be interchangeable with other steps, or combinations of steps, in order to achieve the same or substantially similar result. Moreover, some of the method steps can be carried serially or in parallel, or in any order unless specifically expressed or understood in the context of other method steps.

Figure 1:
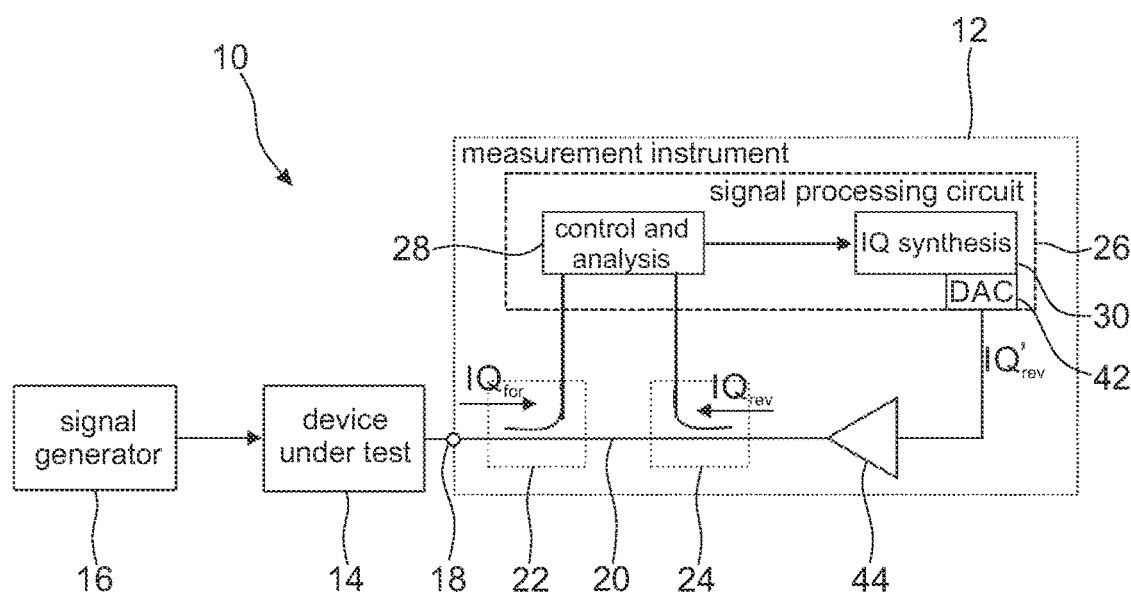
FIG. 1 schematically depicts a measurement system according to an embodiment of the present disclosure.

FIG. 1 depicts a measurement system 10 comprising a measurement instrument 12 and a device under test 14. In general, the measurement instrument 12 is configured to analyze an output signal generated by the device under test 14 in order to assess the performance of the device under test 14.

The device under test 14 may be established as any electronic device that is configured to generate an output signal being an IQ data signal, for example a single carrier orthogonal frequency division multiplexing (OFDM) signal. For example, the device under test 14 may be established as an electronic device with an integrated signal generator generating the IQ data signal, e.g. as a mobile phone. Alternatively, the device under test 14 may be configured as an electronic device being configured to process an IQ data signal e.g., as an amplifier, as a mixer, as a filter, etc.

In the embodiment shown in FIG. 1, the measurement system 10 may also comprise a signal generator 16 that is configured to generate an input signal that is supplied to the device under test 14. The device under test 14 processes the input signal, thereby generating the output signal. The signal generator 16 is shown as provided separately from the measurement instrument 12. However, the signal generator 16 may also be integrated into the measurement instrument 12.

The measurement instrument 12 may be established as any type of suitable measurement device, e.g. as a vector network analyzer, as a digital oscilloscope, as a signal analyzer, etc. The measurement instrument 12 comprises a common port 18 that is connected with an output of the device under test 14, such that the common port 18 receives the output signal generated by the device under test 14.

The measurement instrument 12 further comprises a signal line 20 that is connected with the common port 18. The signal line 20 comprises a first directional coupler portion 22 and a second directional coupler portion 24.

In the embodiment shown in FIG. 1, the first directional coupler portion 22 and the second directional coupler portion 24 are established as separate three-port directional couplers. Alternatively, the first directional coupler portion 22 and the second directional coupler portion 24 may be integrated into a single directional coupler, e.g. into a four-port directional coupler.

The measurement instrument 12 further comprises a signal processing circuit 26 that is connected to the signal line 20 via the first directional coupler portion 22 and via the second directional coupler portion 24. The signal processing circuit 26 comprises a control and analysis circuit 28 and an IQ synthesizer circuit 30.

Figure 2:
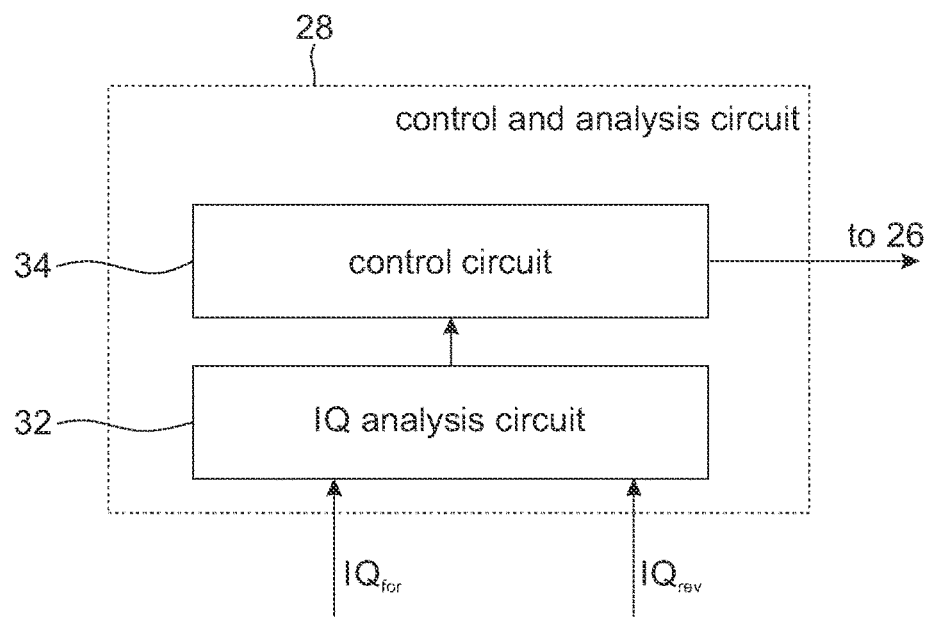
FIG. 2 schematically depicts a representative control and analysis circuit of the measurements system of FIG. 1.

The control and analysis circuit 28 is shown in more detail in FIG. 2. The control and analysis circuit 28 comprises an IQ analysis circuit 32, and a control circuit 34. The IQ analysis circuit 32 is connected with the first directional coupler portion 22 and with the second directional coupler portion 24 so as to receive corresponding signals from the directional coupler portions 22, 24, as will be described in more detail below. The control circuit 34 is provided downstream of the IQ analysis circuit 32 and upstream of the IQ synthesizer circuit 30.

Figure 3A:
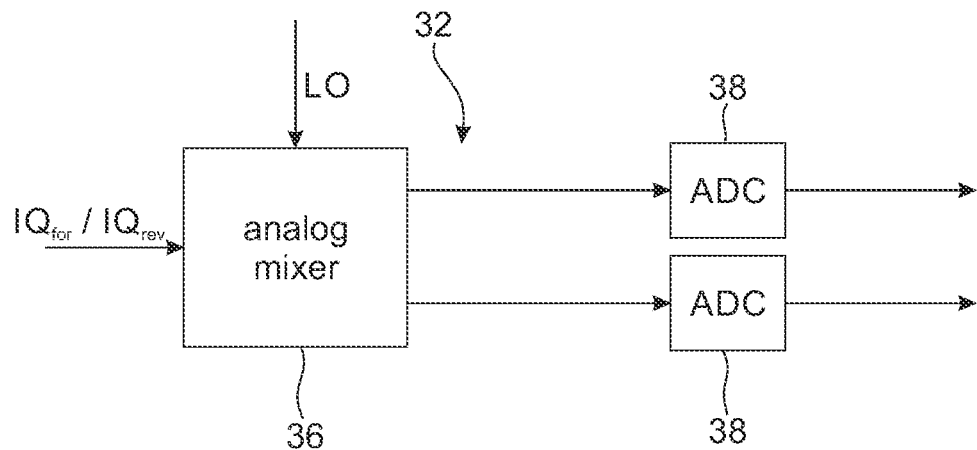
FIG. 3A depicts an embodiment of a portion of an IQ analysis circuit.
Figure 3B:
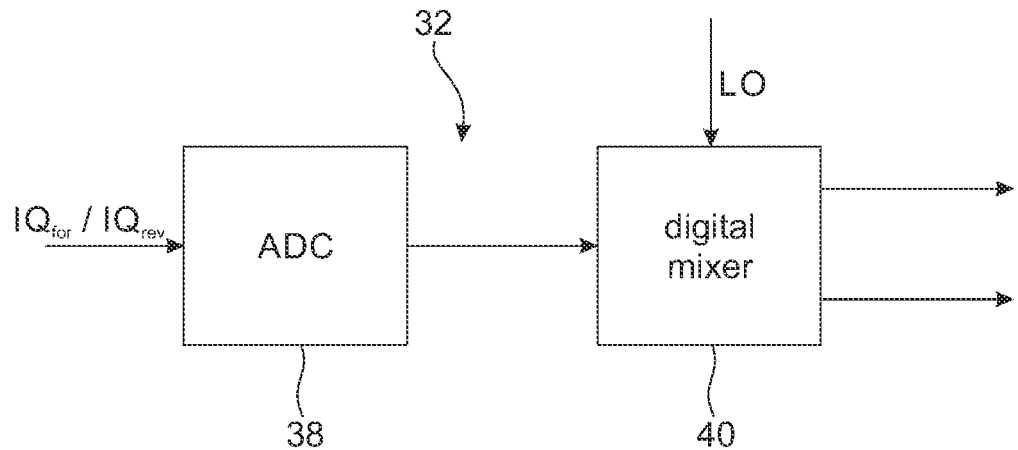
FIG. 3B depicts another embodiment of a portion of an IQ analysis circuit.

The IQ analysis circuit 32 is shown in more detail in FIGS. 3A and 3B. FIG. 3A shows an embodiment of a portion of the IQ analysis circuit 32, wherein the IQ analysis circuit 32 is configured to mix the forward-travelling signal $IQ_{for}$ with a local oscillator signal LO in the analog domain. The IQ analysis circuit 32 comprises an analog mixer 36 that is configured to generate an analog I-signal corresponding to forward-travelling signal $IQ_{for}$ as well as an analog Q-signal corresponding to the forward-travelling signal $IQ_{for}$. The IQ analysis circuit 32 further comprises two analog-to-digital converters (ADC) 38 that are configured to digitize the generated I-signal and the generated Q-signal. The IQ analysis circuit 32 may comprise the components shown in FIG. 3A twice, i.e. one signal path for the forward-travelling signal $IQ_{for}$, and one signal path for the backward-travelling signal $IQ_{rev}$.

FIG. 3B shows an embodiment of a portion of the IQ analysis circuit 32, wherein the IQ analysis circuit 32 is configured to mix the forward-travelling signal $IQ_{for}$ with a local oscillator signal LO in the analog domain. The IQ analysis circuit 32 comprises a single ADC 38 that is configured to digitize the forward-travelling signal $IQ_{for}$. The IQ analysis circuit 32 further comprises a digital mixer 40 that is configured to generate a digital I-signal corresponding to the respective digitized signal as well as a digital Q-signal corresponding to the digitized forward-travelling signal $IQ_{for}$. The IQ analysis circuit 32 may comprise the components shown in FIG. 3B twice, i.e. one signal path for the forward-travelling signal $IQ_{for}$, and one signal path for the backward-travelling signal $IQ_{rev}$.

As is shown in FIG. 1, the measurement instrument 12 may further comprise a digital-to-analog converter (DAC) 42 that is configured to convert an output signal of the IQ synthesizer circuit 30 into an analog signal. In some embodiments, the DAC 42 may be integrated into the IQ synthesizer circuit 30.

The measurement instrument may further comprise an amplifier 44 that is interconnected between the IQ synthesizer circuit 30 and the second directional coupler portion 24. Optionally, an attenuator may be arranged before the amplifier 44 such the amplifier 44 can be operated in the linear range.

The measurement system 10 is configured to perform a testing method of testing the device under test 14, which is described in the following with reference to the examples shown in FIGS. 1 and 4.

A forward-travelling signal $IQ_{for}$ is received via the common port 18 and is forwarded to the IQ analysis circuit 32 by the first directional coupler portion 22 (step S1). The forward-travelling signal corresponds to an output signal of the device under test 14, i.e. the forward-travelling signal $IQ_{for}$ is an IQ data signal. In some embodiments, certain parameters of the forward-travelling signal $IQ_{for}$ may be set manually by an operator or automatically by the measurement system 10, for example by the control circuit 34. For example, a signal period of the forward-travelling signal $IQ_{for}$ and/or a drive level of the device under test 14 may be set.

IQ data associated with the forward-travelling signal $IQ_{for}$ is determined by the IQ analysis circuit 32 (step S2). The determined IQ data is forwarded to the control circuit 34.

Based on the determined IQ data, the control circuit 34 controls the IQ synthesizer circuit 30 to generate a first iteration of a backward-travelling signal $IQ_{rev}'$ (step S3). The backward-travelling signal $IQ_{rev}'$ may be amplified by the amplifier 44. The backward-travelling signal $IQ_{rev}'$ is forwarded to the IQ analysis circuit 32 by the second directional coupler portion. Moreover, the backward-travelling signal $IQ_{rev}'$ is forwarded to the common port 18 by the second directional coupler portion 24 and by the first directional coupler portion 22.

In general, the backward-travelling signal $IQ_{rev}$ being received by the common port 18 and the analysis circuit 32 may be different from the backward-travelling signal $IQ_{rev}'$ generated by the IQ synthesizer circuit 30, e.g. due to non-linearities of the amplifier 44 or other errors. However, as will be described in more detail below, a closed-loop control of the backward-travelling signal $IQ_{rev}'$ being generated is provided, such that all such errors are cancelled out regardless of their origin.

In general, the IQ synthesizer circuit 30 generates the backward-travelling signal $IQ_{rev}'$ such that a desired impedance $Z_{load}(t)$ is presented to the device under test 14, i.e. applied to the device under test 14.

The desired impedance $Z_{load}$ is associated with a predefined reflection coefficient K according to $$K(t) = \frac{Z_{load}(t) - Z_0^*}{Z_{load}(t) + Z_0}.$$

Therein, $Z_0$ is the characteristic impedance of the measurement system 10 downstream of the device under test 14. For example, the characteristic impedance $Z_0$ may be of the magnitude of 50 Ohm.

Further, the predefined reflection coefficient K is associated with the forward-travelling signal $IQ_{for}$ and with the backward travelling signal $IQ_{rev}$ according to $K(t)=IQ_{rev}(t)/IQ_{for}(t)$.

As is indicated by the dependence on t, the reflection coefficient K may be time-dependent, i.e. the reflection coefficient may vary over time.

Thus, the first iteration of the backward-travelling signal may be determined or rather estimated according to $$IQ'_{rev}(t) = \frac{Z_{load}(t) - Z_0^*}{Z_{load}(t) + Z_0} IQ_{for}(t).$$

IQ data associated with the forward-travelling signal $IQ_{for}$ and IQ data associated with the backward-travelling signal $IQ_{rev}$ is determined by the IQ analysis circuit 32 (step S4). The determined IQ data is forwarded to the control circuit 34.

Based on the determined IQ data, the control circuit 34 controls the IQ synthesizer circuit 30 to generate a next iteration of the backward-travelling signal $IQ_{rev}'$ (step S5).

The next iteration of the backward-travelling signal $IQ_{rev,n+1}'$ may be determined according to $$IQ_{rev,n+1}'(t) = A(t) \cdot IQ_{for,n}(t).$$

Therein, the multiplier matrix A(t) may depend on the previously estimated backward-travelling signal $IQ_{rev,n}'$ and/or on the forward-travelling signal $IQ_{for,n}$.

Alternatively, the multiplier matrix A(t) may be calculated stand-alone.

In some embodiments, the multiplier matrix A(t) is calculated on a sample-by-sample basis in the time domain. In other words, the multiplier matrix A(t) may be calculated without regard to adjacent values. In some embodiments, different algorithms and/or numerical methods can be used to increase the efficiency of convergence of the multiplier matrix samples, e.g. Runge-Kutta 4th order using previous estimates. In each iteration, the predefined reflection coefficient K(t) and/or an actually applied load Z(t) may be determined.

Figure 5:
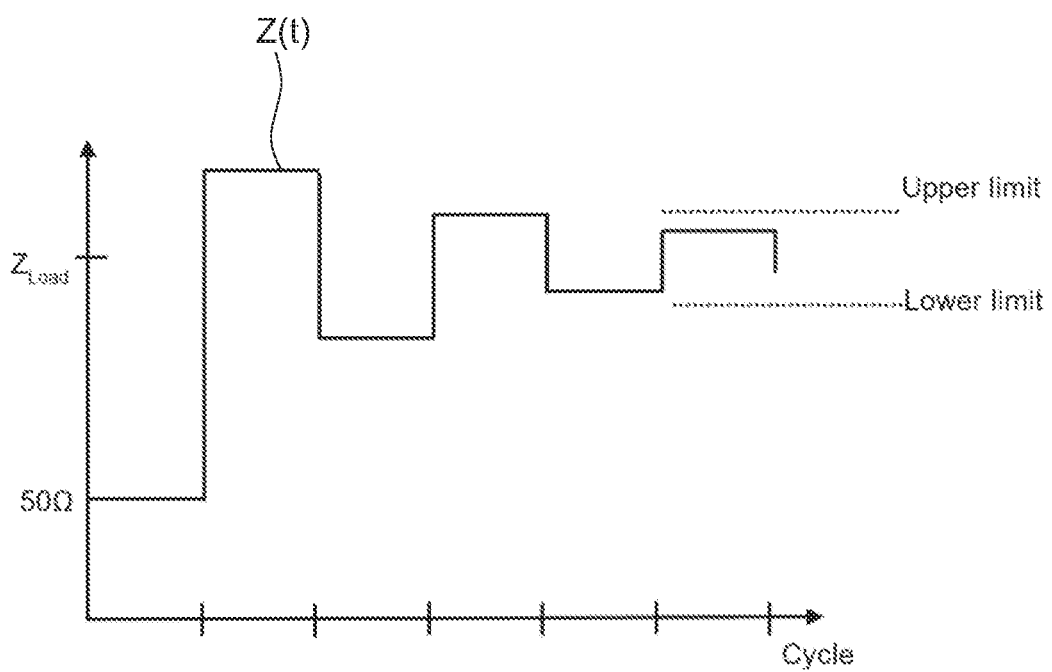
FIG. 5 depicts a plot of an actual impedance applied to a device under test over time.

As is illustrated in FIG. 5, the actually applied load Z(t) may converge to the desired load $Z_{load}$ only after a certain number of cycles, i.e. after a certain number of iterations of generating the backward-travelling signal $IQ_{rev}(t)$. It is noted that FIG. 5 shows a simplified, scalar representation of the actually applied load Z(t). In general, the actually applied load Z(t) is a complex number comprising a real part and an imaginary part.

Accordingly, steps S4 and S5 described above may be repeated until the actually applied load Z(t) has converged sufficiently to the desired impedance $Z_{load}$.

In some embodiments, steps S4 and S5 described above may be repeated until the actually applied load Z(t) stays within an upper limit and a lower limit around the desired impedance $Z_{load}$.

Figure 6A:
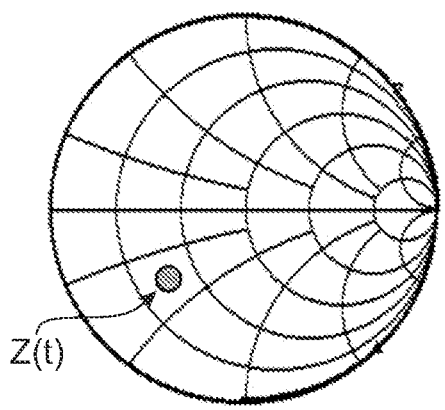
FIGS. 6A to 6C depicts Smith-diagrams of the actual impedance applied to the device under test.
Figure 6B:
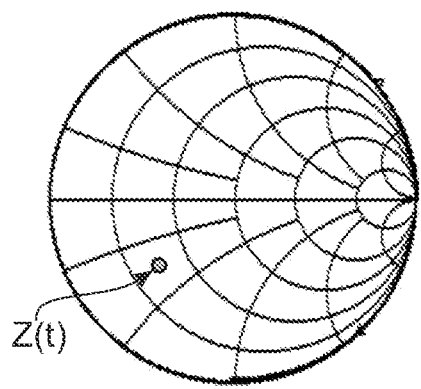
Figure 6C:
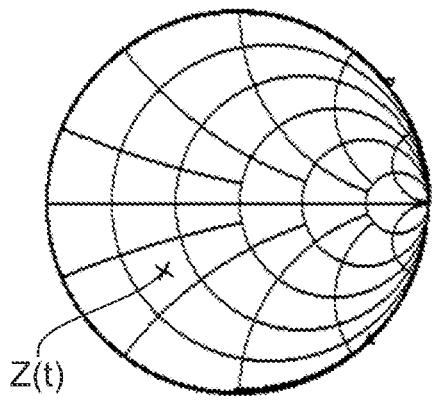

This is further illustrated in FIGS. 6A to 6C. FIG. 6A shows a Smith-diagram of the actually applied load Z(t) within the first few iterations. As is clearly visible, the values of Z(t) vary over a rather large area of the Smith-diagram. FIG. 6B shows a Smith-diagram of the actually applied load Z(t) after the first few iterations. The values of Z(t) vary over a smaller area of the Smith-diagram compared to the Smith-diagram shown in FIG. 6A. FIG. 6C shows a Smith-diagram of the actually applied load Z(t) after the actually applied load Z(t) has converged to the desired impedance $Z_{load}$.

In order to allow for a sufficient convergence of the actually applied load Z(t), the forward-travelling signal $IQ_{for}$ may be periodic for at least a predetermined number of iterations. For example, the device under test 14 may be controlled to generate the same forward-travelling signal $IQ_{for}$ for at least the predetermined number of iterations. Therein, the device under test 14 may be controlled by an operator or by the measurement system 10, for example by the control circuit 34.

After the predefined reflection coefficient is obtained, the output signal of the device under test 14, i.e. the forward-travelling signal $IQ_{for}$, is analyzed by the IQ analysis circuit 32, thereby obtaining at least one performance parameter of the device under test 14 (step S6).

In some embodiments, the at least one performance parameter comprises an error vector magnitude (EVM) and/or an adjacent channel leakage ratio (ACLR). Thus, the EVM and/or the ACLR of the device under test 14 are determined with the desired impedance $Z_{load}$ applied to the device under test 14. However, it is to be understood that any other suitable performance parameter of the device under test 14 may be determined.

The at least one performance parameter may be determined for at least one further desired impedance $Z_{load}$, for a different DUT input power, a different DUT output power, and/or a different frequency of the forward-travelling signal $IQ_{for}$ (step S7).

Accordingly, steps S1 to S6 described above may be repeated for at least one further desired impedance $Z_{load}$.

Alternatively or additionally, the power level of an input signal applied to the device under test 14 by the signal generator 16 may be adapted, and steps S1 to S6 may be repeated for the adapted power level of the input signal.

Alternatively or additionally, the power level of the forward-travelling signal $IQ_{for}$ may be adapted, and steps S1 to S6 may be repeated for the adapted power level of the forward-travelling signal $IQ_{for}$. For example, the device under test 14 may be controlled by an operator or by the control circuit 34 to adapt the power level of the forward-travelling signal $IQ_{for}$.

Alternatively or additionally, a frequency or rather frequencies of the forward-travelling signal $IQ_{for}$ may be adapted, and steps S1 to S6 may be repeated for the adapted frequency of the forward-travelling signal $IQ_{for}$. For example, the device under test 14 may be controlled by an operator or by the control circuit 34 to adapt the frequency of the forward-travelling signal $IQ_{for}$.

This may be repeated an arbitrary number of times for an arbitrary number of desired impedances $Z_{load}$, different DUT input powers, different DUT output powers, and/or different frequencies of the forward-travelling signal $IQ_{for}$. Thus, the at least one of performance parameter may be determined for a plurality of different impedances applied to the device under test 14.

In embodiments of the testing method described above, a closed-loop control of the generated backward-travelling signal $IQ_{rev}'$ is provided, as the previously generated backward-travelling signal $IQ_{rev}'$ is taken into account for generating the next iteration of the backward-travelling signal $IQ_{rev}'$ until the desired impedance $Z_{load}$ is reached. This may also be called a "closed loop load pull technique".

At least steps S1 to S5 of the testing method are performed in time domain. In other words, these steps of the method are performed without applying an FFT to any one of the forward travelling signal $IQ_{for}$, the backward travelling signal $IQ_{rev}$, the IQ data associated with the forward-travelling signal $IQ_{for}$, and the IQ data associated with the backward-travelling signal $IQ_{rev}$.

Figure 7:
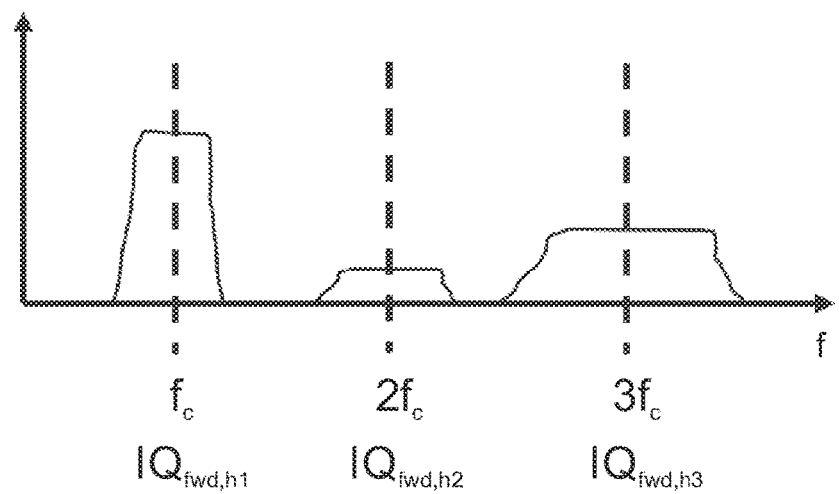
FIG. 7 schematically depicts a plot of a forward-travelling signal over frequency.

As is schematically illustrated in FIG. 7, the forward-travelling signal $IQ_{for}$ usually not only comprises a wanted signal portion $IQ_{for,h1}$ centered around a carrier frequency $f_c$, but also harmonic distortions $IQ_{for,hn}$ centered around integer multiples of the carrier frequency, i.e. at frequencies $n \cdot f_c$.

The measurement system 10 of FIG. 1 can be adapted to also take these harmonic distortions into account, as is described in the following with reference to FIG. 8. In the following, only the differences compared to the embodiment shown in FIG. 1 are described. Further, it to be understood that certain components like the DAC 42 may not be shown in FIG. 8, but may of course be present nevertheless.

Figure 8:
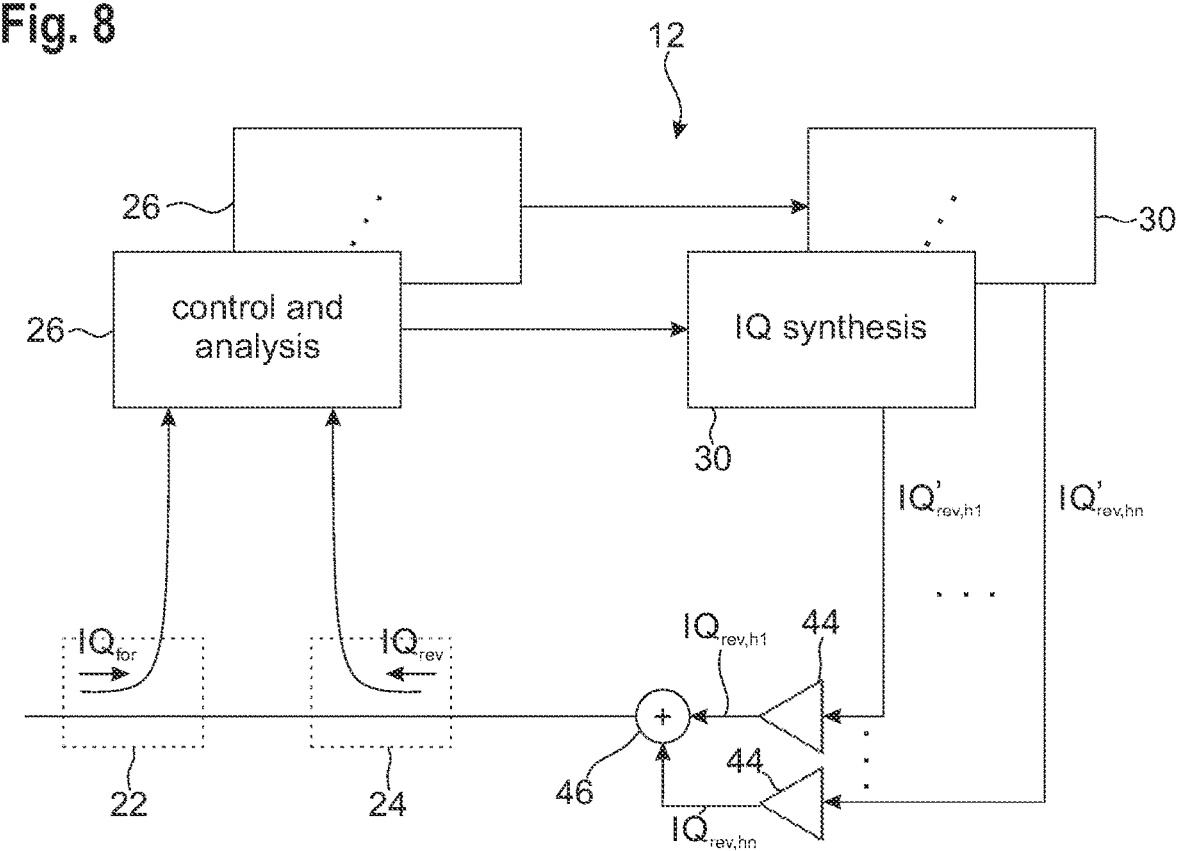
FIG. 8 schematically depicts an embodiment of a portion of the measurement system according to the present disclosure.

As is illustrated in FIG. 8, the measurement instrument 12 may comprise a plurality of copies of the control and analysis circuit 26, of the IQ synthesizer circuit 30, and of the amplifier 44. In other words, several loops may be provided, wherein each loop comprises a control and analysis circuit 26, an IQ synthesizer circuit 30, and an amplifier 44. Therein, each loop may be configured to process a different portion of the forward-travelling signal $IQ_{for}$.

A first one of the loops processes a wanted portion $IQ_{for,h1}$ the forward-travelling signal $IQ_{for}$ as described above, thereby generating a first portion $IQ_{rev,h1}'$ of the backward-travelling signal $IQ_{rev}'$. A second one of the loops processes a first harmonic $IQ_{for,h2}$ of the forward-travelling signal $IQ_{for}$ as described above, thereby generating a second portion $IQ_{rev,h2}'$ of the backward-travelling signal $IQ_{rev}'$ corresponding to the first harmonic of the forward-travelling signal $IQ_{for}$.

In some embodiments, an arbitrary number n of such loops may be provided, such that up to (n−1) harmonics of the forward-travelling signal $IQ_{for}$ are considered for synthesizing the backward-travelling signal $IQ_{rev}$.

The different portions $IQ_{rev,h1}$ to $IQ_{rev,hn}$ of the backward-travelling signal $IQ_{rev}$ may be combined by a combiner circuit 46, thereby obtaining the backward-travelling signal $IQ_{rev}$. The combiner circuit 46 may, for example, be a filter-based combiner, such as a diplexer or a triplexer. Alternatively, the combiner circuit 46 may be a power combiner or any other suitable type of combiner.

Therein, all loops may receive the forward-travelling signal $IQ_{for}$ and the backward travelling signal $IQ_{rev}$ via the directional coupler portions 22, 24.

The control and analysis circuits 26 may comprise appropriate filters in order to filter out the respective signal portions to be processed.

In some embodiments, the measurement system 10 may be configured to perform the testing method described above, wherein up to (n−1) harmonics of the forward-travelling signal $IQ_{for}$ are considered for synthesizing the backward-travelling signal $IQ_{rev}$.

Alternatively or additionally to considering harmonics of the forward-travelling signal $IQ_{for}$, the multi-loop architecture shown in FIG. 8 may also be used in order to process forward-travelling signals $IQ_{for}$ comprising several different frequency bands, i.e. different frequency bands that are non-harmonically related.

Figure 9:
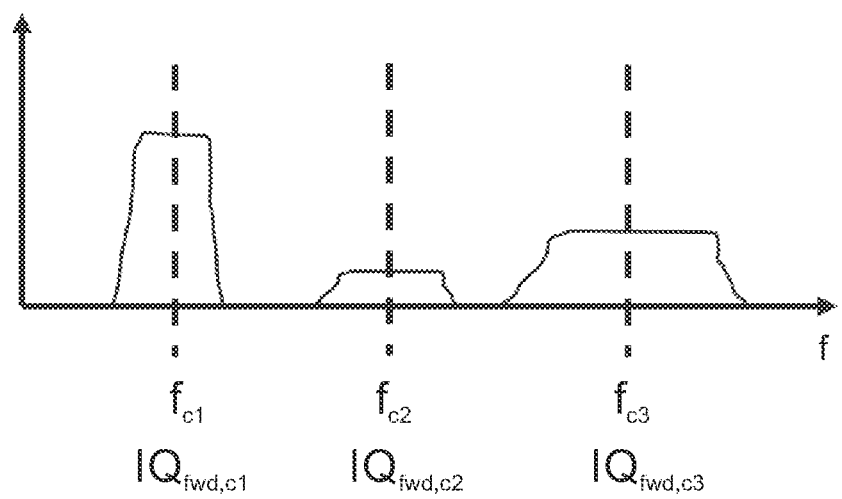
FIG. 9 schematically a further plot of a forward-travelling signal over frequency.

As is illustrated in FIG. 9, the forward-travelling signal $IQ_{for}$ may comprise a first signal portion $IQ_{for,c1}$ centered around a first carrier frequency $f_{c1}$, a second signal portion $IQ_{for,c2}$ centered around a second carrier frequency $f_{c2}$, etc.

In some embodiments, the forward-travelling signal $IQ_{for}$ may comprise up to n different signal portions associated with up to n different carrier frequencies, wherein the different carrier frequencies may have arbitrary relations to each other.

Analogously to as described above with respect to the harmonics, a first one of the loops may process the first signal portion $IQ_{for,c1}$ of the forward-travelling signal $IQ_{for}$, thereby generating a corresponding first portion $IQ_{rev,c1}'$ of the backward-travelling signal $IQ_{rev}'$. A second one of the loops may process the second signal portion $IQ_{for,c2}$ of the forward-travelling signal $IQ_{for}$, thereby generating a corresponding second portion $IQ_{rev,c2}'$ of the backward-travelling signal $IQ_{rev}'$, etc.

In some embodiments, the measurement system 10 may be configured to perform the testing method described above, wherein up to n different portions of the forward-travelling signal $IQ_{for}$ having different frequencies are considered for synthesizing the backward-travelling signal $IQ_{rev}$.

Therein, the individual portions $IQ_{rev,cn}'$ of the backward-travelling signal $IQ_{rev}'$ may be generated such that the same predefined impedance is applied to the device under test 14 in all frequency bands associated with the different portions $IQ_{for,cn}$ of the forward-travelling signal $IQ_{for}$.

However, it is also conceivable that the individual portions $IQ_{rev,cn}'$ of the backward travelling signal $IQ_{rev}'$ may be generated such that different predefined impedances are applied to the device under test 14 in different frequency bands associated with the different portions $IQ_{for,cn}$ of the forward-travelling signal $IQ_{for}$.

Certain embodiments disclosed herein include components, such as the measurement instrument 12, the device under test 14, the signal generator 16, the signal processing circuit 26, the control and analysis circuit 28, the IQ synthesizer circuit 30, the IQ analysis circuit 32, and the control circuit 34, that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof.

In an embodiment, circuitry includes hardware circuit implementations (e.g., implementations in analog circuitry, implementations in digital circuitry, and the like, and combinations thereof). In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

Various embodiments of the present disclosure or the functionality thereof may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably). Such non-transitory computer-readable storage media include all computer-readable media (including volatile and non-volatile media).

Embodiments of the present disclosure may also take the form of an apparatus, system, computing device, computing entity, and/or the like executing instructions stored on computer-readable storage media to perform certain steps or operations. The computer-readable media include cooperating or interconnected computer-readable media, which exist exclusively on a processing or processor system or distributed among multiple interconnected processing or processor systems that may be local to, or remote from, the processing or processor system. However, embodiments of the present disclosure may also take the form of an entirely hardware embodiment performing certain steps or operations.

Various embodiments are described above with reference to block diagrams and/or flowchart illustrations of apparatuses, methods, systems, and/or computer program instructions or program products. It should be understood that each block of any of the block diagrams and/or flowchart illustrations, respectively, or portions thereof, may be implemented in part by computer program instructions, e.g., as logical steps or operations executing on one or more computing devices. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein.

These computer program instructions may also be stored in one or more computer-readable memory or portions thereof, such as the computer-readable storage media described above, that can direct one or more computers or computing devices or other programmable data processing apparatus(es) to function in a particular manner, such that the instructions stored in the computer-readable memory produce an article of manufacture including computer-readable instructions for implementing the functionality specified in the flowchart block or blocks.

The computer program instructions may also be loaded onto one or more computers or computing devices or other programmable data processing apparatus(es) to cause a series of operational steps to be performed on the one or more computers or computing devices or other programmable data processing apparatus(es) to produce a computer-implemented process such that the instructions that execute on the one or more computers or computing devices or other programmable data processing apparatus(es) provide operations for implementing the functions specified in the flowchart block or blocks and/or carry out the methods described herein.

It will be appreciated that the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A measurement system for testing a device under test, the measurement system comprising
a common port configured to be connectable to a signal output of the device under test, wherein the device under test comprises electronic circuitry configured to generate an IQ data signal as an output signal or to process an IQ data signal to obtain the output signal;
a signal line connected to the common port, wherein the signal line comprises a first directional coupler portion and a second directional coupler portion;
a signal processing circuit, wherein the signal processing circuit comprises an IQ analysis circuit, an IQ synthesizer circuit, and a control circuit;
wherein the IQ analysis circuit is connected with the common port via the first directional coupler portion so as to receive a forward-travelling signal from the common port,
wherein the IQ analysis circuit is configured to determine IQ data associated with the forward-travelling signal,
wherein the IQ synthesizer circuit is connected to the signal line, wherein the IQ synthesizer circuit is configured to generate a backward-travelling signal that is forwarded to the common port,
wherein the IQ analysis circuit is further connected with the signal line via the second directional coupler portion so as to receive the backward-travelling signal,
wherein the IQ analysis circuit is configured to determine IQ data associated with the backward-travelling signal, and
wherein the control circuit is configured to control the IQ synthesizer circuit such that a predefined reflection coefficient is obtained, wherein the predefined reflection coefficient corresponds to a ratio of the backward-travelling signal and the forward-travelling signal.

2. The measurement system of claim 1, wherein the backward-travelling signal is an IQ data stream.

3. The measurement system of claim 1, wherein the control circuit is configured to control the IQ synthesizer circuit to iteratively adapt the backward-travelling signal, such that the predefined reflection coefficient is obtained.

4. The measurement system of claim 3, wherein the forward-travelling signal is periodic for at least a predetermined number of iterations.

5. The measurement system of claim 1, wherein the predefined reflection coefficient is determined based on a desired impedance that is to be applied to the device under test.

6. The measurement system of claim 5, wherein the predefined reflection coefficient is determined based on the desired impedance and based on a characteristic impedance of the measurement system.

7. The measurement system of claim 6, wherein the predefined reflection coefficient is determined according to $K=(Z_T-Z_0^*)/(Z_T+Z_0)$, wherein K is the predefined reflection coefficient, $Z_T$ is the desired impedance, and $Z_0$ is the characteristic impedance.

8. The measurement system of claim 1, wherein the IQ analysis circuit is configured to analyze the output signal of the device under test after the predefined reflection coefficient is obtained, thereby obtaining at least one performance parameter of the device under test.

9. The measurement system of claim 8, wherein the at least one performance parameter comprises an error vector magnitude (EVM) and/or an adjacent channel leakage ratio (ACLR).

10. The measurement system of claim 8, wherein the at least one performance parameter is determined for at least one further predefined reflection coefficient, for a different DUT input power, a different DUT output power, and/or a different frequency of the forward-travelling signal.

11. The measurement system of claim 1, wherein IQ data associated with the forward-travelling signal and the IQ data associated with the backward-travelling signal are determined in time domain.

12. The measurement system of claim 1, wherein the backward-travelling signal is generated in time domain.

13. The measurement system of claim 1, wherein the forward-travelling signal is a single carrier orthogonal frequency division multiplexing (OFDM) signal.

14. The measurement system of claim 1, wherein the IQ analysis circuit is configured to determine the IQ data associated with the forward-travelling signal and/or the IQ data associated with the backward-travelling signal in absence of a reference signal.

15. The measurement system of claim 1, wherein the IQ analysis circuit is configured to mix the forward-travelling signal with a local oscillator signal in the analog domain or in the digital domain in order to determine the IQ data associated with the forward-travelling signal,
and/or wherein the IQ analysis circuit is configured to mix the backward-travelling signal with a local oscillator signal in the analog domain or in the digital domain in order to determine the IQ data associated with the backward-travelling signal.

16. The measurement system of claim 1, wherein the IQ synthesizer circuit comprises a digital-to-analog converter for generating the backward-travelling signal.

17. A testing method of testing a device under test, the testing method comprising the steps of:
receiving, by a common port, an output signal of the device under test, wherein the device under test comprises electronic circuitry configured to generate an IQ data signal as the output signal or to process an IQ data signal to obtain the output signal;

forwarding, by a first directional coupler portion, a forward-travelling signal corresponding to the output signal to an IQ analysis circuit of a signal processing circuit;

determining, by the IQ analysis circuit, IQ data associated with the forward-travelling signal;

generating, by an IQ synthesizer circuit, a backward-travelling signal;

forwarding, by a second directional coupler portion, the backward-travelling signal to the IQ analysis circuit;

determining, by the IQ analysis circuit, IQ data associated with the backward-travelling signal; and controlling, by a control circuit, the IQ synthesizer circuit such that a predefined reflection coefficient is obtained, wherein the predefined reflection coefficient corresponds to a ratio of the backward-travelling signal and the forward-travelling signal.

18. The testing method of claim 17, wherein the backward-travelling signal is iteratively adapted such that a predefined reflection coefficient is obtained, wherein the predefined reflection coefficient corresponds to a ratio of the backward-travelling signal and the forward-travelling signal.

19. The testing method of claim 17, wherein all steps are performed in time domain.

20. A measurement system for testing a device under test, the measurement system comprising a common port configured to be connectable to a signal output of the device under test, wherein the device under test comprises electronic circuitry configured to generate an IQ data signal as an output signal or to process an IQ data signal to obtain the output signal;

a signal line connected to the common port, wherein the signal line comprises a first directional coupler portion and a second directional coupler portion; and a signal processing circuit, wherein the signal processing circuit comprises an IQ analysis circuit and an IQ synthesizer circuit;

wherein the IQ analysis circuit is connected with the common port via the first directional coupler portion so as to receive a forward-travelling signal from the common port, wherein the IQ analysis circuit is configured to determine IQ data associated with the forward-travelling signal, wherein the IQ synthesizer circuit is connected to the signal line, wherein the IQ synthesizer circuit is configured to generate a backward-travelling signal that is forwarded to the common port, such that a defined non-matched impedance is presented to the device under test, wherein the IQ analysis circuit is further connected with the signal line via the second directional coupler portion so as to receive the backward-travelling signal, and wherein the IQ analysis circuit is configured to determine IQ data associated with the backward-travelling signal.

* * * * *